United States Patent
Ito et al.

(10) Patent No.: US 10,124,652 B2
(45) Date of Patent: Nov. 13, 2018

(54) VEHICULAR HEAT MANAGEMENT SYSTEM

(71) Applicant: TOYOTA JIDOSHA KABUSHIKI KAISHA, Toyota-shi, Aichi-ken (JP)

(72) Inventors: Satoru Ito, Shizuoka-ken (JP); Takashi Amano, Susono (JP); Hidefumi Aikawa, Shizuoka-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 318 days.

(21) Appl. No.: 15/012,972

(22) Filed: Feb. 2, 2016

(65) Prior Publication Data
US 2016/0221417 A1    Aug. 4, 2016

(30) Foreign Application Priority Data
Feb. 4, 2015  (JP) .................. 2015-020276

(51) Int. Cl.
  *B60H 1/03*    (2006.01)
  *B60H 1/22*    (2006.01)
  (Continued)

(52) U.S. Cl.
  CPC ....... *B60H 1/2221* (2013.01); *B60H 1/00314* (2013.01); *B60H 1/00778* (2013.01);
  (Continued)

(58) Field of Classification Search
  CPC .............. B60H 1/2221; B60H 1/00314; B60H 1/00778; B60H 1/00885; B60H 1/2218;
  (Continued)

(56) References Cited

U.S. PATENT DOCUMENTS 6,332,580 B1*  12/2001  Enander ............. B60H 1/00364
                                                237/12.3 B
6,454,180 B2*   9/2002  Matsunaga ........ B60H 1/00485
                                                165/41
(Continued)

FOREIGN PATENT DOCUMENTS

DE          4316981 A1 *  11/1994  .............. B60S 1/481
JP       2001-263061 A       9/2001
(Continued)

OTHER PUBLICATIONS

"JP_2003322018_A_M—Machine Translation.pdf", Machine translation, JPO.org, dated Feb. 9, 2018.*

*Primary Examiner* — Gregory Huson
*Assistant Examiner* — Daniel E Namay
(74) *Attorney, Agent, or Firm* — Hunton Andrews Kurth LLP

(57) ABSTRACT

A vehicular heat management system including a heater for carrying out heating of a heat medium and stop the heating, and a heat exchanger configured to carry out heat exchange between lubricant oil for lubricating a speed change apparatus and the heat medium. A heat medium circulator is provided that is configured to switch the heat medium circulation state between a first circulation state where the heat medium circulates through the heater and the heat exchanger, and a second circulation state where the heat medium circulates through the heater and a heater core. An electronic control unit is also provided.

2 Claims, 11 Drawing Sheets

(51) Int. Cl.
*F01M 5/02* (2006.01)
*F02N 19/04* (2010.01)
*F01M 5/00* (2006.01)
*B60H 1/00* (2006.01)

(52) U.S. Cl.
CPC ........... *B60H 1/00885* (2013.01); *B60H 1/03* (2013.01); *B60H 1/2218* (2013.01); *F01M 5/001* (2013.01); *F01M 5/005* (2013.01); *F01M 5/021* (2013.01); *F02N 19/04* (2013.01); *B60H 2001/2234* (2013.01); *F01P 2060/04* (2013.01); *F01P 2060/08* (2013.01)

(58) Field of Classification Search
CPC .... B60H 1/00928; B60H 1/2209; B60H 1/03; B60H 2001/2234; B60H 2001/00307; F01M 5/021; F01M 5/001; F01M 5/005; F02N 19/04; F01P 2060/04; F01P 2060/08
USPC .................................... 237/5, 12.3 B
See application file for complete search history.

(56) References Cited

U.S. PATENT DOCUMENTS

| | | | | |
|---|---|---|---|---|
| 6,604,576 B2* | 8/2003 | Noda | ................ | B60H 1/00878 165/202 |
| 6,769,623 B2* | 8/2004 | Ban | .................... | B60H 1/00492 123/41.14 |
| 8,409,055 B2* | 4/2013 | Gooden | ................ | F01M 5/001 165/41 |
| 8,807,446 B2* | 8/2014 | Han | ......................... | B60L 1/02 165/146 |
| 2004/0050944 A1* | 3/2004 | Matsunaga | ........ | B60H 1/00385 237/12.3 B |
| 2006/0213460 A1* | 9/2006 | Aoki | .................. | B60H 1/00885 123/41.05 |
| 2007/0063062 A1* | 3/2007 | Hernandez | ......... | B60H 1/00314 237/12.3 B |
| 2009/0101312 A1* | 4/2009 | Gooden | .............. | F16H 57/0413 165/104.19 |
| 2010/0065376 A1* | 3/2010 | Pursifull | ................. | F01M 5/001 184/6.22 |
| 2011/0138807 A1* | 6/2011 | Ulrey | ........................ | F01N 5/02 60/605.1 |
| 2012/0125278 A1* | 5/2012 | Ries-Mueller | ........ | B60W 10/06 123/142.5 R |
| 2013/0313031 A1* | 11/2013 | Porras | ....................... | F01N 5/02 180/65.21 |
| 2014/0114515 A1* | 4/2014 | Porras | ................ | B60H 1/00385 701/22 |
| 2014/0114516 A1* | 4/2014 | Badger | ................. | B60W 20/00 701/22 |
| 2014/0158784 A1* | 6/2014 | Lundberg | .................. | F01P 7/14 237/5 |
| 2014/0262135 A1* | 9/2014 | Sheppard | ........... | B60H 1/00314 165/42 |
| 2015/0101789 A1* | 4/2015 | Enomoto | ........... | B60H 1/00485 165/202 |
| 2015/0115048 A1* | 4/2015 | Brodie | ............... | B60H 1/00764 237/2 B |
| 2015/0285161 A1* | 10/2015 | Ulrey | ...................... | F02D 23/02 477/3 |

FOREIGN PATENT DOCUMENTS

| | | | | |
|---|---|---|---|---|
| JP | 2002-137624 A | | 5/2002 | |
| JP | 2003-322018 A | | 11/2003 | |
| JP | 2004203306 A | * | 7/2004 | |
| JP | 2010023527 A | * | 2/2010 | ............. B60L 3/003 |
| JP | 201 421 821 | * | 11/2014 | |
| WO | 2014/065309 A1 | | 5/2014 | |

* cited by examiner

FIG. 2
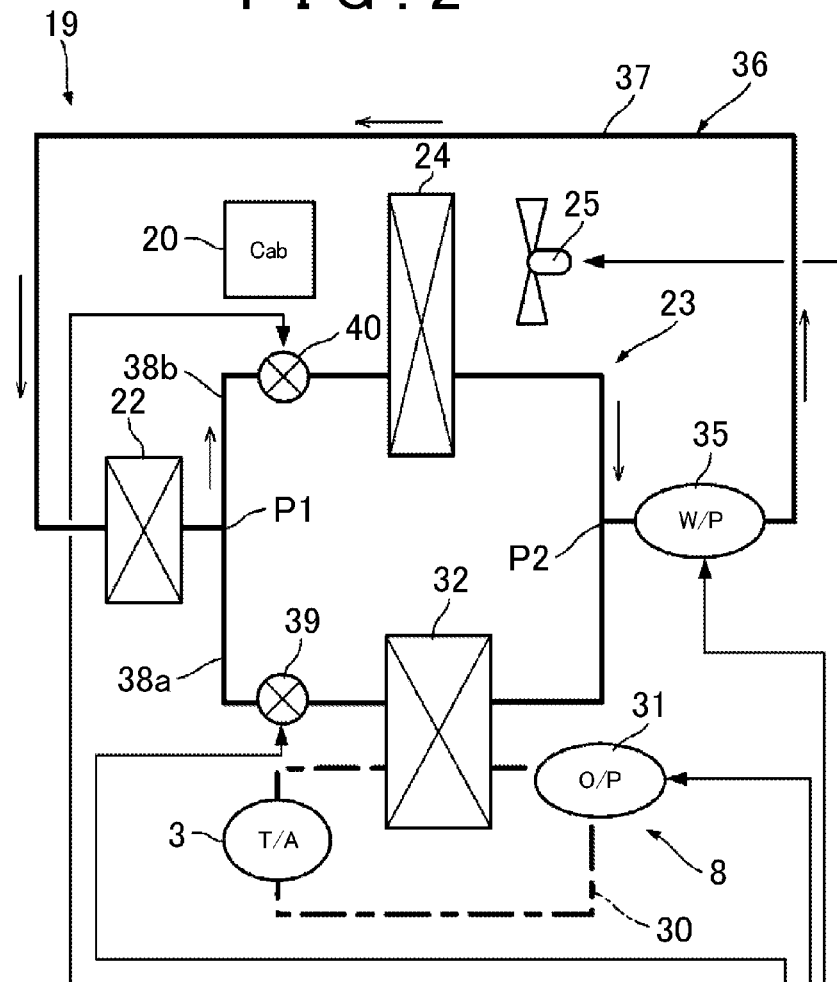
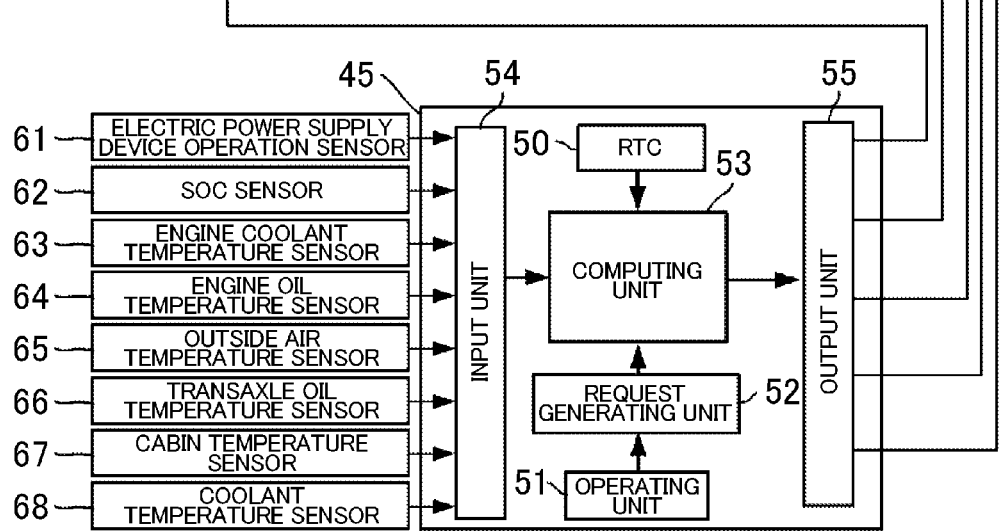

FIRST CIRCULATION STATE

SECOND CIRCULATION STATE

SECOND CIRCULATION STATE
(AT DECREASED COOLANT TEMPERATURE)

SECOND CIRCULATION STATE

FIRST CIRCULATION STATE

VEHICULAR HEAT MANAGEMENT SYSTEM

INCORPORATION BY REFERENCE

The disclosure of Japanese Patent Application No. 2015-020276 filed on Feb. 4, 2015 including the specification, drawings and abstract is incorporated herein by reference in its entirety.

BACKGROUND OF THE INVENTION

1. Field of the Invention

Embodiments of the present invention relate to a vehicular heat management system capable of carrying out pre-heating before the operation of a vehicle.

2. Description of Related Art

An example of known vehicular heat management systems is described in WO 2014/065309. The vehicular heat management system described in WO 2014/065309 is mounted in a hybrid vehicle, and executes lubricant oil warm-up control for raising the temperature of lubricant oil for a speed change apparatus before the operation of the vehicle. In addition, Japanese Patent Application Publication No. 2001-263061 (JP 2001-263061 A) and Japanese Patent Application Publication No. 2002-137624 (JP 2002-137624 A) describe related art pertaining to the technical field of embodiments of the present invention.

SUMMARY

In some cases, a heat management system configured to carry out preheating before the operation of a vehicle receives both a heating request to carry out air-conditioning before the operation of the vehicle and a warm-up request to carry out a warm-up operation of a speed change apparatus before the operation of the vehicle. In the heat management system, a heat medium is used. There is a difference between the heat medium temperature required to fulfill the heating request and the heat medium temperature required to fulfill the warm-up request. Therefore, in the above case, the wasted heat may be generated, depending on the order in which the heating request and the warm-up request are fulfilled.

Embodiments of the present invention provide a vehicular heat management system configured to reduce generation of the heat to be wasted.

A vehicular heat management system according to an aspect of the invention includes: a speed change apparatus lubricated with lubricant oil, and an air-conditioner including a heater core. The air-conditioner is configured to heat a vehicle cabin by using the heater core as a heat source. A heater is provided that is configured to carry out heating of a heat medium and to stop this heating. A heat exchanger is provided that is configured to carry out heat exchange between the lubricant oil and the heat medium. A heat medium circulator configured to switch a circulation state of the heat medium between a first circulation state where the heat medium is circulated through the heater and the heat exchanger, and a second circulation state where the heat medium is circulated through the heater and the heater core. An electronic control unit is also provided that is configured to: i) warm up the speed change apparatus by heating the lubricant oil in response to a pre-operation warm-up request, before an operation of the vehicle; ii) heat the vehicle cabin in response to a pre-operation heating request, before the operation of the vehicle; and iii) execute a first operation and a second operation when both the pre-operation warm-up request and the pre-operation heating request have been issued. In the first operation, the lubricant oil is heated to a prescribed oil temperature by the heat exchanger in the first circulation state while the heat medium is heated by the heater. In the second operation, the circulation state is switched from the first circulation state to the second circulation state after the lubricant oil reaches the prescribed oil temperature, and heating of the heat medium by the heater is stopped until a vehicle cabin temperature of the vehicle cabin reaches a prescribed cabin temperature.

With the vehicular heat management system according to the above embodiment of the invention, when a pre-operation warm-up request and a pre-operation heating request are both issued, the first operation is executed, so that the speed change apparatus is warmed up before the vehicle cabin is heated. The heat medium temperature required to warm up the speed change apparatus is higher than the heat medium temperature required to heat the vehicle cabin. Thus, the exhaust heat available after the completion of the warm-up of the speed change apparatus can be used to heat the vehicle cabin. This makes it possible to reduce wasted heat generation. After the temperature of the lubricant oil reaches the prescribed oil temperature through the execution of the first operation, the second operation is executed, so that heating of the heat medium by the heater is stopped until the temperature of the vehicle cabin reaches the prescribed cabin temperature. This makes it possible to reduce the energy that is required for the operation of the heater.

In the vehicular heat management system according to the above embodiment, the heat medium circulator may include a pump configured to pump the heat medium to be circulated. The heat medium circulator includes a main path through which the heat medium flows, a first branch path, a second branch path, a first valve, and a second valve. The pump and the heater, which is located downstream of the pump, may be disposed on the main path, and the main path may branch into the first branch path and the second branch path, at a branching point located between the heater and the pump. The first branch path and the second branch path may merge into the main path at a merging point located upstream of the pump. The heat exchanger may be disposed on the first branch path, and the heater core may be disposed on the second branch path. The first valve may be configured to be operated between an opening position for opening the first branch path and a closing position for closing the first branch path, and the second valve may be configured to be operated between an opening position for opening the second branch path and a closing position for closing the second branch path. The electronic control unit may be configured to control, when there are both the pre-operation warm-up request and the pre-operation heating request have been issued, the first valve and the second valve in the following manner. The electronic control unit i) places the first valve in the opening position and places the second valve in the closing position while the heat medium is heated by the heater, as the first operation, and ii) places the first valve in the closing position and places the second valve in the opening position while heating of the heat medium by the heater is stopped, as the second operation that is executed after completion of the first operation.

As described so far, with the vehicular heat management system according to the above embodiment of the invention, when a pre-operation warm-up request and a pre-operation heating request are both issued, the first operation is executed, so that the speed change apparatus is warmed up before the vehicle cabin is heated. Thus, the exhaust heat available after the completion of the warm-up of the speed change apparatus can be used to heat the vehicle cabin. After the temperature of the lubricant oil reaches the prescribed oil temperature through the execution of the first operation, the second operation is executed, so that heating of the heat medium by the heater is stopped until the temperature of the vehicle cabin reaches the prescribed cabin temperature. This makes it possible to reduce wasted heat generation, thereby enabling reduction in the energy that is required for the operation of the heater.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a configuration diagram illustrating the details of the heat management system in FIG. 1;

DETAILED DESCRIPTION OF EMBODIMENTS

Figure 1:
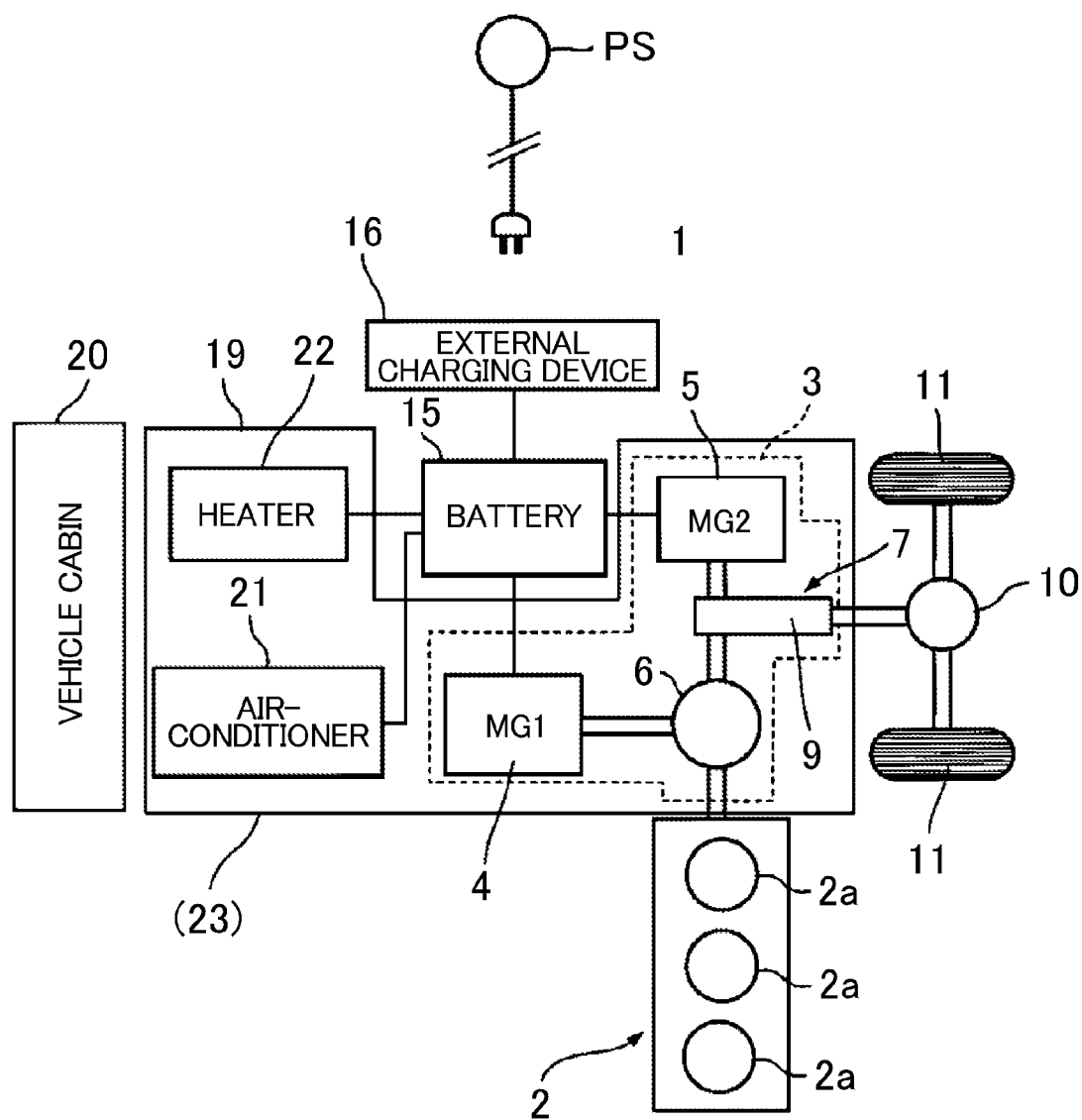
FIG. 1 is a diagram illustrating the overall configuration of a hybrid vehicle provided with a vehicular heat management system according to an embodiment of the invention.

As illustrated in FIG. 1, a vehicle 1 includes multiple power sources used in combination, and the vehicle 1 is a plug-in hybrid vehicle that can be charged with electric power supplied from an external electric power supply PS. The vehicle 1 includes an in-line three-cylinder spark ignition internal combustion engine 2, and a hybrid transaxle unit (hereinafter, simply referred to as "transaxle") 3. The internal combustion engine 2 includes three cylinders 2a. The transaxle 3 is connected to the internal combustion engine 2. The transaxle 3 is an example of a speed change apparatus according to an embodiment of the invention. The transaxle 3 includes two motor generators 4, 5, and a power split device 6. The power split device 6 splits the power output from the internal combustion engine 2, distributes part of the power to the first motor generator 4, and distributes the rest of the power to an output unit 7. The transaxle 3 is lubricated with lubricant oil (not illustrated). The lubricant oil is circulated by a transaxle lubricating apparatus 8 illustrated in FIG. 2.

The power split device 6 is a planetary gear mechanism. The second motor generator 5 is connected to the output unit 7 in such a manner that torque can be transmitted between the second motor generator 5 and the output unit 7. The output unit 7 is provided with a gear train 9. The power output via the gear train 9 from the output unit 7 is transmitted to right and left drive wheels 11 by a differential mechanism 10.

The internal combustion engine 2 and each of the motor generators 4, 5 function as driving sources for moving the vehicle 1. The first motor generator 4 is an example of an electric generator that generates electric power using the power that is generated by the internal combustion engine 2 and then distributed to the first motor generator 4 by the power split device 6. The first motor generator 4 may also function as an electric motor driven by alternating currents. Similarly, the second motor generator 5 may function as an electric motor, and may also function as an electric generator. Each of the motor generators 4, 5 is connected to a battery 15 via various devices (not illustrated) including, for example, a control circuit. The vehicle 1 is provided with an external charging device 16 used to charge the battery 15 with electric power supplied from the external electric power supply PS. The electric power supplied from the battery 15 is consumed by various components of the vehicle 1.

The vehicle 1 is provided with a heat management system 19. The heat management system 19 includes an air-conditioner 21, a coolant heater 22, which is an example of a heater in the invention, and a coolant circulator 23 (refer to FIG. 2). The air-conditioner 21 is mounted in the vehicle 1, and carries out air-conditioning of a vehicle cabin 20, such as heating or cooling of the vehicle cabin 20. The coolant heater 22 heats a coolant, which is an example of a heat medium, used in, for example, the air-conditioner 21. The coolant circulator 23 circulates the coolant, which is a medium to be heated by the coolant heater 22, through various portions such as the air-conditioner 21. The coolant circulator 23 is an example of a heat medium circulator in the invention. In the heat management system 19, the coolant is heated by the coolant heater 22 in response to a prescribed remote operation transmitted from a user via, for example, wireless communication, and the coolant circulation states are switched by the coolant circulator 23. In this way, the heat management system 19 warms up various portions of the vehicle 1 before the operation of the vehicle 1.

As illustrated in FIG. 2, the air-conditioner 21 includes a heater core 24 and an electric blower 25. The heater core 24 is used as a heat source for heating the vehicle cabin 20. The blower 25 is used to send the outside air, which is the air outside the vehicle cabin 20, or the inside air, which is the air inside the vehicle cabin 20, to the heater core 24, and to send the hot air heated by the heater core 24 into the vehicle cabin 20. The blower 25 is driven by the electric power supplied from the battery 15. The coolant heater 22 is an electrically-driven heater that is driven by the electric power supplied from the battery 15. The coolant heater 22 is capable of heating the coolant and stopping heating of the coolant. The coolant heater 22 may be a heat pump.

The transaxle lubricating apparatus 8 includes an oil circulation path 30 and an oil pump 31. The oil pump 31 pumps the lubricant oil to be circulated through the oil circulation path 30. With this configuration, the lubricant oil is introduced into various portions of the transaxle 3 and the lubricant oil discharged from the transaxle 3 is introduced again into the various portions of the transaxle 3. The oil pump 31 is an electric pump that is driven by the electric power supplied from the battery 15.

The heat management system 19 further includes an oil cooler 32, which is an example of a heat exchanger in the invention. The oil cooler 32 carries out heat exchange between the lubricant oil flowing through the oil circulation path 30 and the coolant circulated by the coolant circulator 23. The coolant circulator 23 is capable of switching the coolant circulation state between a first circulation state (refer to FIG. 3A) and a second circulation state (refer to FIG. 3B). In the first circulation state, the coolant is circulated through the coolant heater 22 and the oil cooler 32. In the second circulation state, the coolant is circulated through the coolant heater 22 and the heater core 24. Specifically, the coolant circulator 23 includes an electric coolant pump 35 capable of pumping the coolant, and a circulation path 36 through which the coolant is circulated. The coolant pump 35 is an example of a pump in the invention.

The circulation path 36 includes a main path 37, a first branch path 38a, a second branch path 38b, a first valve 39, and a second valve 40. The coolant pump 35 and the coolant heater 22, which is located downstream of the coolant pump 35, are disposed on the main path 37. The main path 37 branches into the first branch path 38a and the second branch path 38b. The first valve 39 is disposed on the first branch path 38a. The second valve 40 is disposed on the second branch path 38b. The branch paths 38a, 38b branch from the main path 37 at a branching point P1 located between the coolant heater 22 and the coolant pump 35, and merge into the main path 37 at a merging point P2 located upstream of the coolant pump 35. The oil cooler 32 is disposed on the first branch path 38a downstream of the first valve 39. The heater core 24 is disposed on the second branch path 38b downstream of the second valve 40. The first valve 39 can be operated between an opening position for opening the first branch path 38a and a closing position for closing the first branch path 38a. The second valve 40 can be operated between an opening position for opening the second branch path 38b and a closing position for closing the second branch path 38b.

With the above configuration, the coolant circulator 23 is put into the first circulation state by placing the first valve 39 in the opening position and placing the second valve 40 in the closing position while the coolant pump 35 is driven, or is put into the second circulation state by placing the first valve 39 in the closing position and placing the second valve 40 in the opening position while the coolant pump 35 is driven.

The heat management system 19 further includes an electronic control unit 45 that is a computer configured to execute various controls relating to heat management in the vehicle 1. The electronic control unit 45 includes physical electronic devices, and various units that are logically configured by executing prescribed programs. Examples of these electronic devices include a real-time clock (RTC) 50 and an operating unit 51. The real-time clock 50 outputs the current time. The operating unit 51 receives commands for preheating of various portions of the vehicle 1, which are carried out before the operation of the vehicle 1. The preheating commands are issued in response to user's operations of a terminal, such as a mobile phone, and then transmitted via wireless communication. The operating unit 51 then outputs signals corresponding to the preheating commands.

Examples of the units that are logically configured in the electronic control unit 45 include a request generating unit 52 and a computing unit 53. The request generating unit 52 generates preheating requests in response to output signals from the operating unit 51. Examples of the preheating requests include a pre-operation warm-up request, which is a request to warm up the transaxle 3, and a pre-operation heating request, which is a request to heat the vehicle cabin 20. The computing unit 53 receives the information regarding various requests output from the request generating unit 52 and the information regarding the current time output from the RTC 50. Based on the received information, the computing unit 53 executes prescribed computations. Signals that are output from various sensors are input into the computing unit 53 via an input unit 54. Control commands for various portions to be controlled are prepared by the computing unit 53, and output from the electronic control unit 45 via an output unit 55.

Examples of the sensors associated with embodiments of the invention and disposed in the vehicle 1 include: an electric power supply device operation sensor 61 that outputs a signal indicating the operational state of the external electric power supply device 16; an SOC sensor 62 that outputs a signal indicating the state of charge (SOC) of the battery 15; an engine coolant temperature sensor 63 that outputs a signal indicating the temperature of the coolant for the internal combustion engine 2; an engine oil temperature sensor 64 that outputs a signal indicating the temperature of the lubricant oil for the internal combustion engine 2; an outside air temperature sensor 65 that outputs a signal indicating the temperature of the outside air; a transaxle oil temperature sensor 66 that outputs a signal indicating the temperature of the lubricant oil for the transaxle 3; a cabin temperature sensor 67 that outputs a signal indicating the temperature of the vehicle cabin 20; and a coolant temperature sensor 68 that outputs a signal indicating the temperature of the coolant used in the heat management system 19.

Hereinafter, the main control executed by the electronic control unit 45 according to the embodiment of the invention will be described with reference to FIG. 3A, FIG. 3B, and FIG. 3C. FIG. 4A and FIG. 4B illustrate a comparative control example to be compared with the control executed by the electronic control unit 45.

Figure 3A:
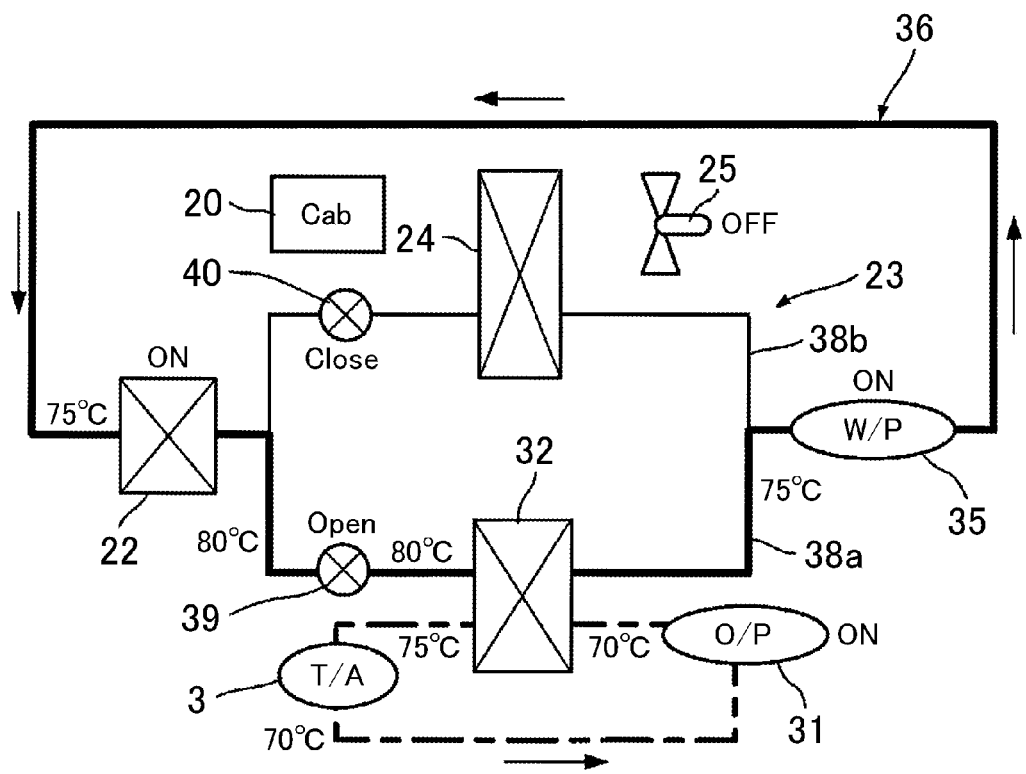
FIG. 3A is a diagram illustrating the temperatures of a coolant and the like at various portions and the operational states of devices when a transaxle is warmed up in a first circulation state according to the embodiment.
Figure 3B:
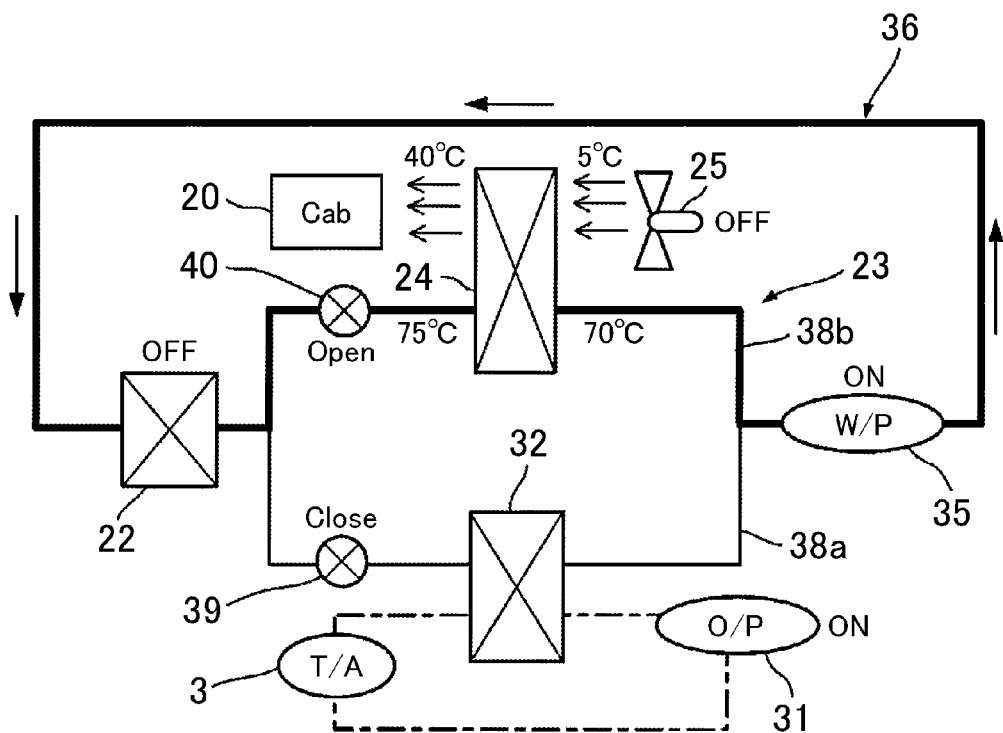
FIG. 3B is a diagram illustrating the temperatures of the coolant and the like at various portions and the operational states of the devices when a vehicle cabin is heated in a second circulation state according to the embodiment.
Figure 3C:
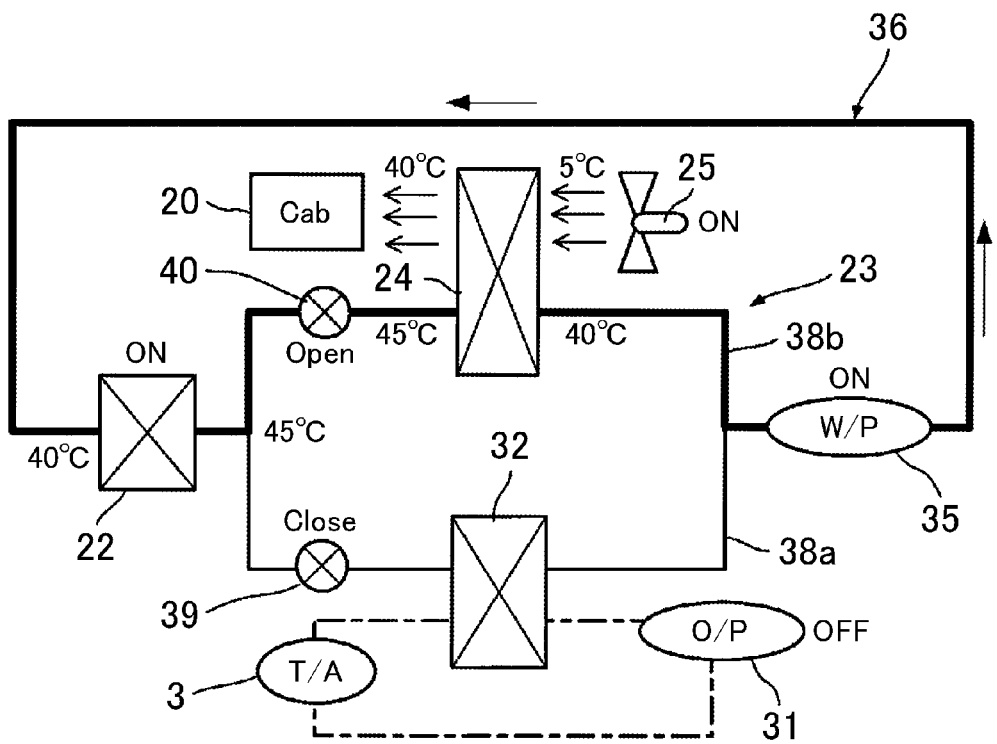
FIG. 3C is a diagram illustrating the temperatures of the coolant and the like at the various portions and the operational states of the devices when the temperature of the coolant is decreased while the vehicle cabin is heated in the second circulation state according to the embodiment.
Figure 4A:
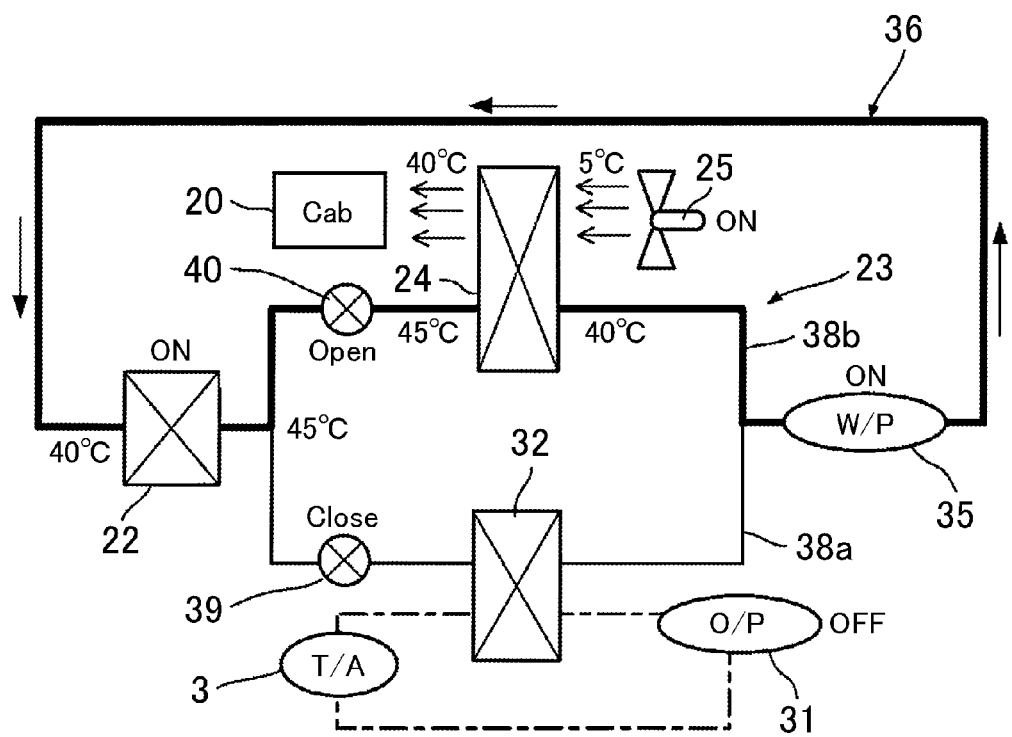
FIG. 4A is a diagram illustrating the temperatures of the coolant and the like at the various portions and the operational states of the devices when the vehicle cabin is heated in a second circulation state according to a comparative example.
Figure 4B:
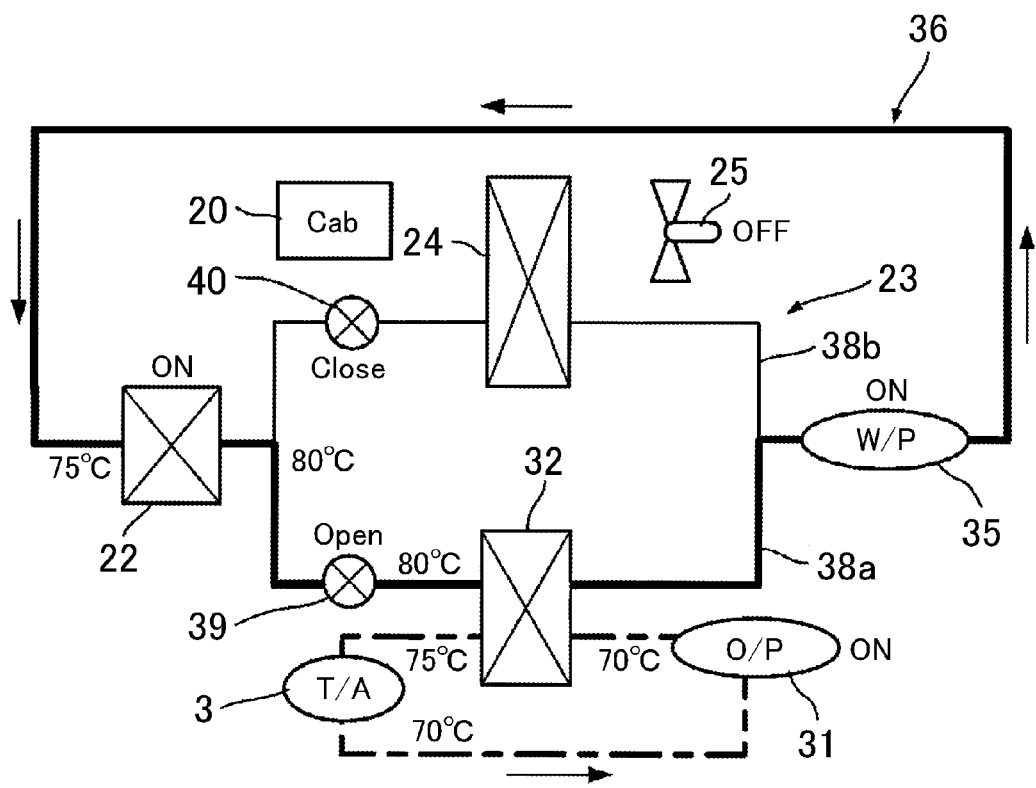
FIG. 4B is a diagram illustrating the temperatures of the coolant and the like at the various portions and the operational states of the devices when the transaxle is warmed up in a first circulation state according to the comparative example.

FIGS. 3A to 3C illustrate the operational states of various devices of the heat management system 19 and the circulation states of the coolant and lubricant oil when preheating commands as described above are given to the vehicle 1 by a user and a pre-operation warm-up request and a pre-operation heating request are both issued. The electronic control unit 45 first switches the circulation state of the circulation path 36 to the first circulation state in FIG. 3A, and then switches the circulation state from the first circulation state to the second circulation state in FIG. 3B. In other words, a warm-up of the transaxle 3 takes precedence over heating of the vehicle cabin 20. FIG. 3C illustrates the state where the temperature of the coolant is decreased after the circulation state of the circulation path 36 is switched to the second circulation state.

In FIGS. 3A to 3C, a path indicated by a bold line represents a path through which the coolant or the lubricant oil is flowing, an arrow on a path represents the direction in which the coolant or the lubricant oil is flowing, a numerical value represents the temperature of the coolant, the lubricant oil, or the air, "Open" represents a state where a valve is in the opening position, "Close" represents a state where a valve is in the closing position, and "ON" or "OFF" represents the operational states of each device (the same applies to FIG. 4A and FIG. 4B). Note that, each temperature-representing numerical value in the drawings is indicated as only an example for use in understanding the circulation states of FIGS. 3A-C and FIGS. 4A-C, and does not accurately reflect the numerical value at an actual device.

As illustrated in FIG. 3A, the electronic control unit 45 causes the coolant circulator 23 to switch the circulation state to the first circulation state, and the electronic control unit 45 executes a first operation on the coolant circulator 23. In the first operation, the lubricant oil is heated to a prescribed oil temperature by the oil cooler 32 while the coolant is heated by the coolant heater 22. Thus, for example, the temperature of the coolant and the temperature of the lubricant oil exhibit tendencies indicated by the numerical values in FIG. 3A.

After the first operation executed on the coolant circulator 23 is completed, the electronic control unit 45 executes a second operation on the coolant circulator 23. As illustrated in FIG. 3B, in the second operation, the circulation state is switched from the first state to the second state, and heating of the coolant by the coolant heater 22 is stopped until the temperature of the vehicle cabin 20 reaches a prescribed cabin temperature. The coolant temperature required to heat the vehicle cabin 20 is lower than the coolant temperature required to warm up the transaxle 3. Thus, even when heating of the coolant is stopped by stopping the operation of the coolant heater 22, it is still possible to continue heating of the vehicle cabin 20 until the temperature of the coolant is decreased to the lower limit. In other words, the heat of the coolant, which is normally to be wasted, can be used for heating the vehicle cabin 20. When heating of the vehicle cabin 20 is continued with the coolant heater 22 kept in the non-operating state, the temperature of the coolant and the like exhibit tendencies indicated by the numerical values in FIG. 3B.

As illustrated in FIG. 3C, when the coolant temperature is decreased to the lower limit by continuing heating of the vehicle cabin 20 with heating of the coolant by the coolant heater 22 stopped, the temperature of the coolant and the like exhibit tendencies indicated by the numerical values in FIG. 3C. The electronic control unit 45 resumes heating of the coolant by switching the coolant heater 22 from the non-operating state to the operating state. Thus, heating of the vehicle cabin 20 prior to the operation of the vehicle 1 continues.

Unlike in the above-described control executed by the electronic control unit 45, in the control according to the comparative example, when a pre-operation warm-up request and a pre-operation heating request are both issued, heating of the vehicle cabin 20 is carried out prior to a warm-up of the transaxle 3. In this case, first, the vehicle cabin 20 is heated by switching the circulation state of the circulation path 36 to the second circulation state, as illustrated in FIG. 4A. Then, as illustrated in FIG. 4B, the transaxle 3 is warmed up by switching the circulation state to the first circulation state. In the control according to the comparative example, after heating of the vehicle cabin 20 is completed, heating of the coolant by the coolant heater 22 is continued and the transaxle 3 is warmed up. Thus, there is no chance of placing the coolant heater 22 in the non-operating state and an extra amount of heat is required to heat the coolant after the completion of heating of the vehicle cabin 20.

A concrete example of the above-described control according to the embodiment will be described below. The electronic control unit 45 executes the control routine in FIG. 5 and the subroutines in FIGS. 6 to 8, which are defined in FIG. 5. Programs for the control routines in FIGS. 5 to 8 are stored in the electronic control unit 45, and are repeatedly executed at prescribed intervals after being read at appropriate times.

Figure 5:
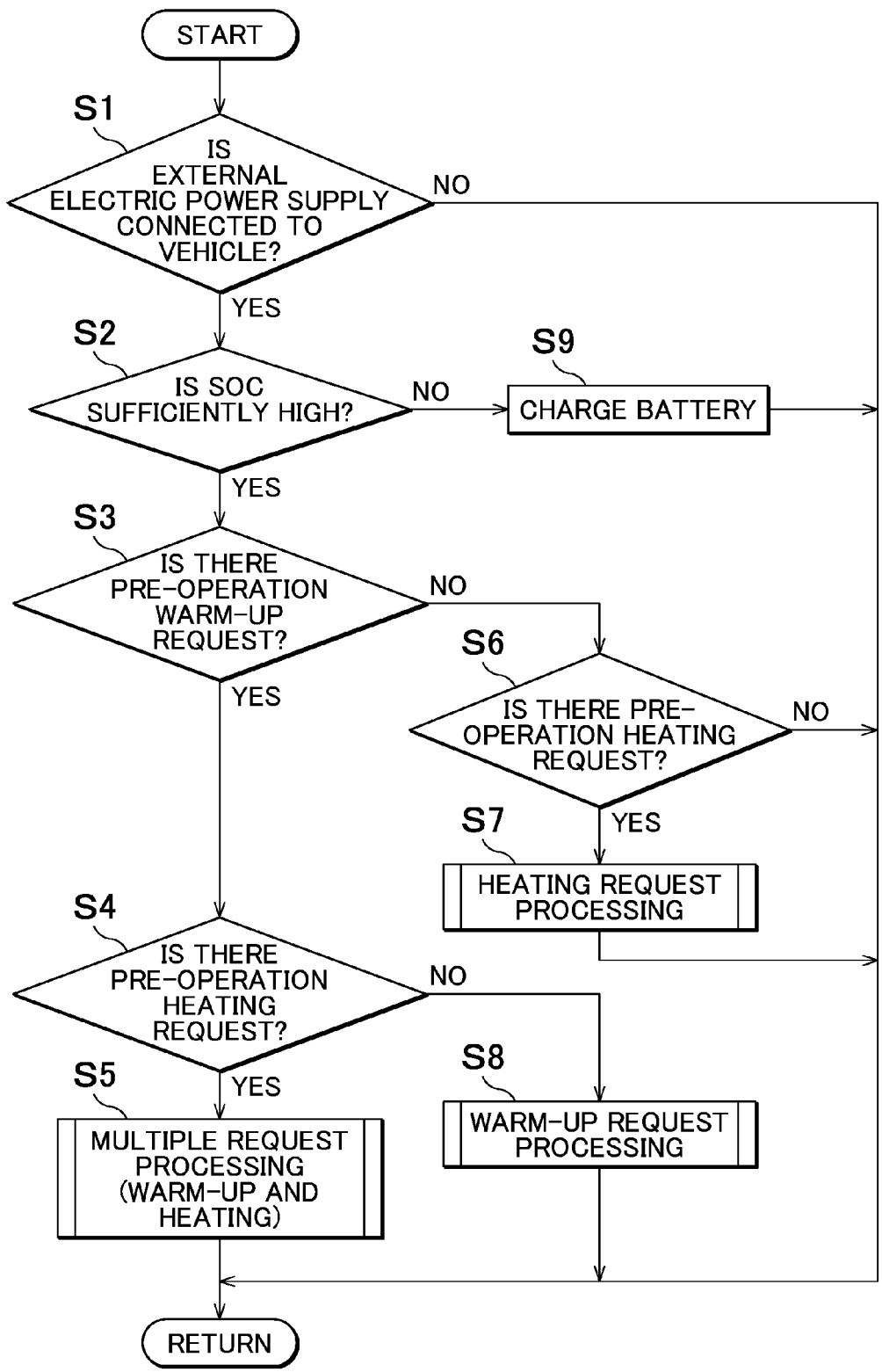
FIG. 5 is a flowchart illustrating an example of a main routine of a control routine according to the embodiment of the invention.

In step S1 of a flowchart in FIG. 5, the electronic control unit 45 determines whether the external electric power supply PS is connected to the vehicle 1, based on an output signal from the electric power supply device operation sensor 61. In this case, the control is executed when the condition that the external electric power supply PS is connected to the vehicle 1 is satisfied. This is because the operation of the vehicle 1 has yet to be started when the above condition is satisfied. However, connection of the external electric power supply PS to the vehicle 1 need not be used as the condition for executing the control. When the external electric power supply PS is connected to the vehicle 1, the electronic control unit 45 proceeds to step S2. On the other hand, when the external electric power supply PS is not connected to the vehicle 1, the electronic control unit 45 ends the present routine without executing the subsequent steps.

In step S2, the electronic control unit 45 determines whether the state of charge (SOC) of the battery 15 is sufficiently high based on an output signal from the SOC sensor 62. When the state of charge of the battery 15 is sufficiently high, the electronic control unit 45 proceeds to step S3. On the other hand, when the state of charge of the battery 15 is not sufficiently high, the electronic control unit 45 proceeds to step S9. In step S9, the battery 15 is charged with the electric power supplied from the external electric power supply PS by a prescribed procedure. Then, the present routine ends.

In step S3, the electronic control unit 45 determines whether there is a pre-operation warm-up request, based on the information from the request generating unit 52 in FIG. 2. When there is a pre-operation warm-up request, the electronic control unit 45 proceeds to step S4. In step S4, the electronic control unit 45 determines whether there is a pre-operation heating request. When the electronic control unit 45 determines in step S4 that there is a pre-operation heating request, it is deemed that the pre-operation warm-up request and the pre-operation heating request are both issued. In this case, the electronic control unit 45 proceeds to step S5. In step S5, the electronic control unit 45 executes multiple request processing, which will be described later in detail. As a result, a warm-up of the transaxle 3 and heating of the vehicle cabin 20 are carried out in the above-described order. Then, the present routine ends.

When the electronic control unit 45 determines in step S3 that there is no pre-operation warm-up request, the electronic control unit 45 proceeds to step S6. In step S6, the electronic control unit 45 determines whether there is a pre-operation heating request. When the electronic control unit 45 determines in step S6 that there is a pre-operation heating request, it is deemed that only the pre-operation heating request is issued by the user. Thus, the electronic control unit 45 proceeds to step S7. In step S7, the electronic control unit 45 executes heating request processing, which will be described later in detail, so that the vehicle cabin 20 is heated before the operation of the vehicle 1.

When the electronic control unit 45 determines in step S4 that there is no pre-operation heating request, it is deemed that only the pre-operation warm-up request is issued by the user. Thus, the electronic control unit 45 proceeds to step S8. In step S8, the electronic control unit 45 executes warm-up request processing, which will be described later in detail, so that the transaxle 3 is warmed up before the operation of the vehicle 1. Then, the present routine ends.

Figure 6:
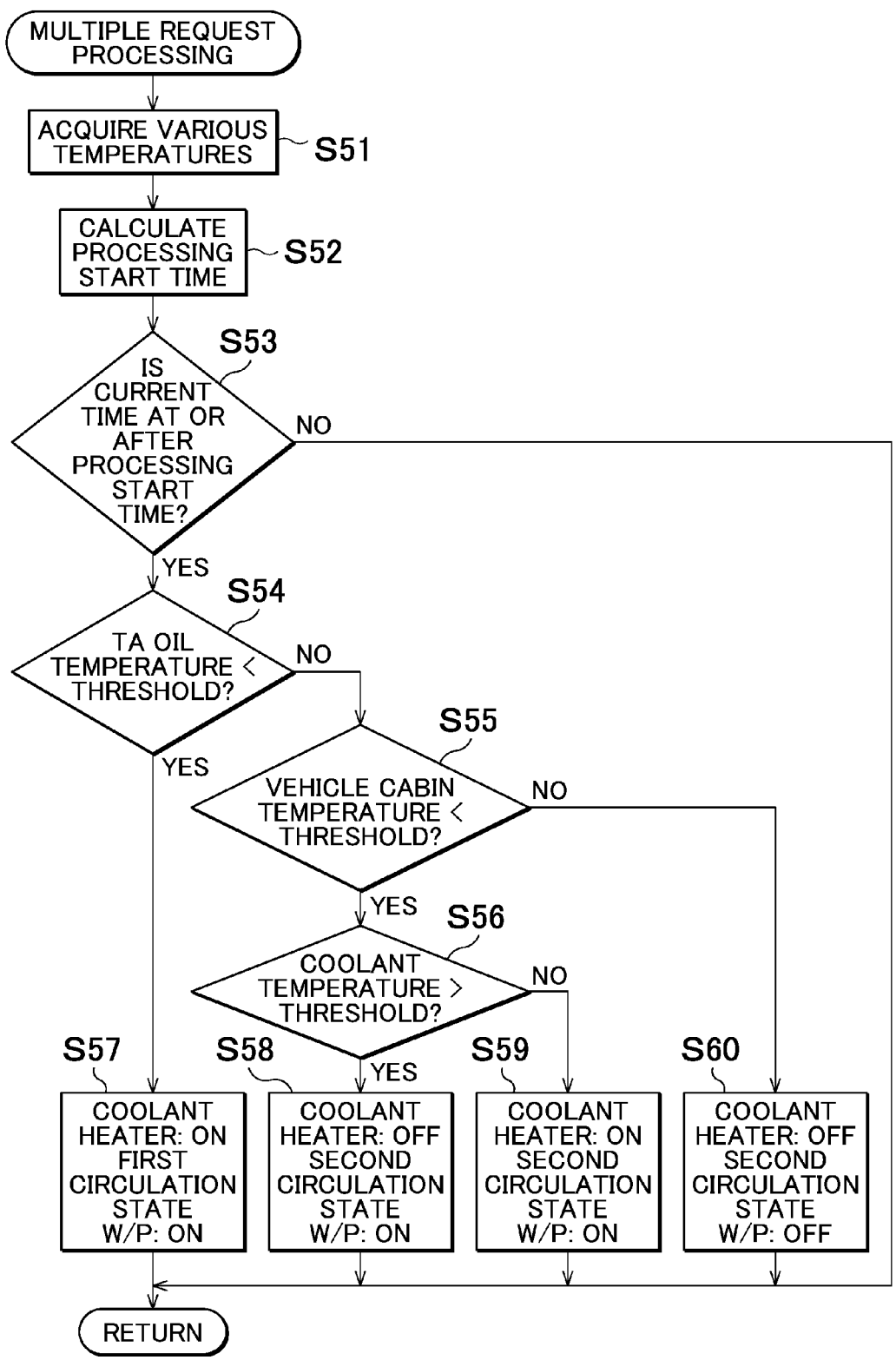
FIG. 6 is a flowchart illustrating an example of a subroutine indicating multiple request processing defined in FIG. 5.

In the multiple request processing in FIG. 6, the electronic control unit 45 acquires various temperatures in step S51. The various temperatures mean the temperature of the coolant for the internal combustion engine 2, the temperature of the lubricant oil for the internal combustion engine 2, and the temperature of the outside air. The electronic control unit 45 acquires these temperatures, based on output signals from the engine coolant temperature sensor 63, the engine oil temperature sensor 64, and the outside air temperature sensor 65. Acquisition of these temperatures enables the electronic control unit 45 to obtain the temperature state of the vehicle 1 and the temperature environmental condition of the vehicle 1. The temperature state of the vehicle 1 and the temperature environmental condition of the vehicle 1 have an influence on the duration of time that a warm-up or heating is carried out. Then, the electronic control unit 45 proceeds to step S52. In step S52, the electronic control unit 45 estimates the duration of time that a warm-up is to be carried out based on the temperatures acquired in step S51. Then, the electronic control unit 45 calculates a processing start time based on the estimated duration of time that the warm-up is carried out and the operation start time set by the user. For example, the processing start time is calculated such that the warm-up is completed three minutes before the operation start time set by the user.

In step S53, the electronic control unit 45 acquires the current time from the RTC 50, and determines whether the current time is at or after the processing start time by comparing the current time with the processing start time calculated in step S52. When the current time is before the processing start time, the electronic control unit 45 ends the routine without executing the subsequent steps so that execution of the subsequent steps is suspended. When the current time is at or after the processing start time, the electronic control unit 45 proceeds to step S54 to start or continue the subsequent steps.

In step S54, the electronic control unit 45 determines whether the temperature of the lubricant oil for the transaxle 3 (TA oil temperature) is lower than a threshold that is a prescribed oil temperature. When the TA oil temperature is lower than the threshold, the electronic control unit 45 proceeds to step S57. In step S57, the electronic control unit 45 turns on the coolant heater 22 to heat the coolant, switches the circulation state to the first circulation state, and turns on the coolant pump (water pump (W/P)) 35, thereby circulating the coolant through the circulation path 36 in the first circulation state.

On the other hand, when the electronic control unit 45 determines that the TA oil temperature is equal to or higher than the threshold, it is deemed that the warm-up of the transaxle 3 is completed. Thus, the electronic control unit 45 proceeds to step S55. In step S55, the electronic control unit 45 determines whether the temperature of the vehicle cabin 20 is lower than a threshold that is a prescribed cabin temperature. When the temperature of the vehicle cabin 20 is lower than the threshold, the electronic control unit 45 proceeds to step S56. In step S56, the electronic control unit 45 determines whether the temperature of the coolant flowing through the circulation path 36 exceeds a threshold that is a prescribed temperature. When the temperature of the coolant exceeds the threshold, the vehicle cabin 20 can be heated with the exhaust heat from the coolant. In step S58, the electronic control unit 45 turns off the coolant heater 22 to stop heating of the coolant, switches the circulation state of the circulation path 36 to the second circulation state, and turns on the coolant pump 35, thereby heating the vehicle cabin 20 with the exhaust heat from the coolant. On the other hand, when the electronic control unit 45 determines in step S56 that the temperature of the coolant is lower than the threshold, the vehicle cabin 20 cannot be heated with the exhaust heat from the coolant. Thus, in step S59, the electronic control unit 45 turns on the coolant heater 22 to heat the coolant, switches the circulation state to the second circulation state, and turns on coolant pump 35, thereby circulating the coolant through the circulation path 36 in the second circulation state.

When the electronic control unit 45 determines in step S55 that the temperature of the vehicle cabin 20 is equal to or higher than the threshold, it is deemed that heating of the vehicle cabin 20 is completed. Then, in step S60, the electronic control unit 45 turns off the coolant heater 22, switches the circulation state to the second circulation state, and then turns off the coolant pump 35 to stop circulation of the coolant.

Figure 7:
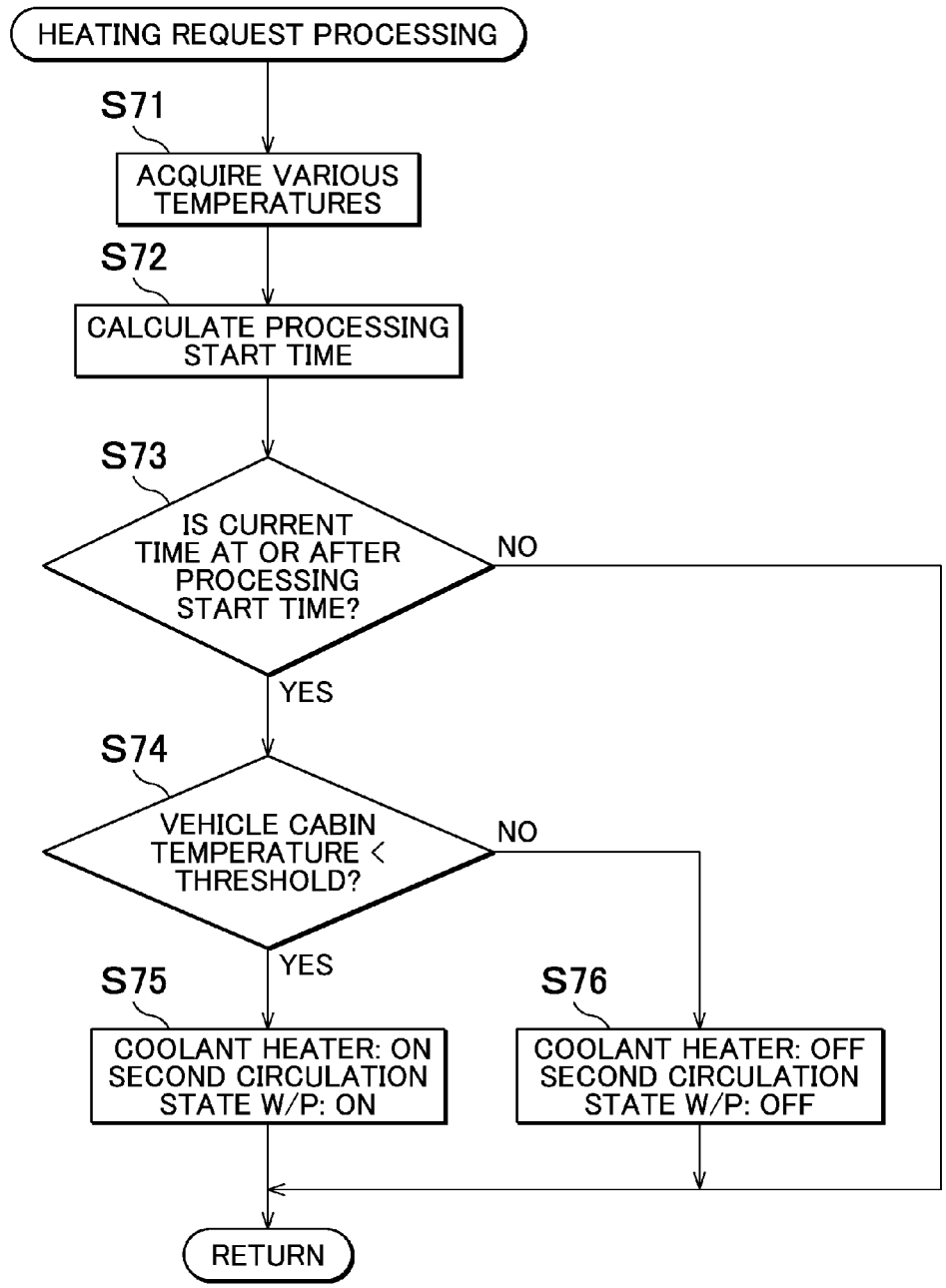
FIG. 7 is a flowchart illustrating an example of a subroutine indicating heating request processing defined in FIG. 5.
Figure 8:
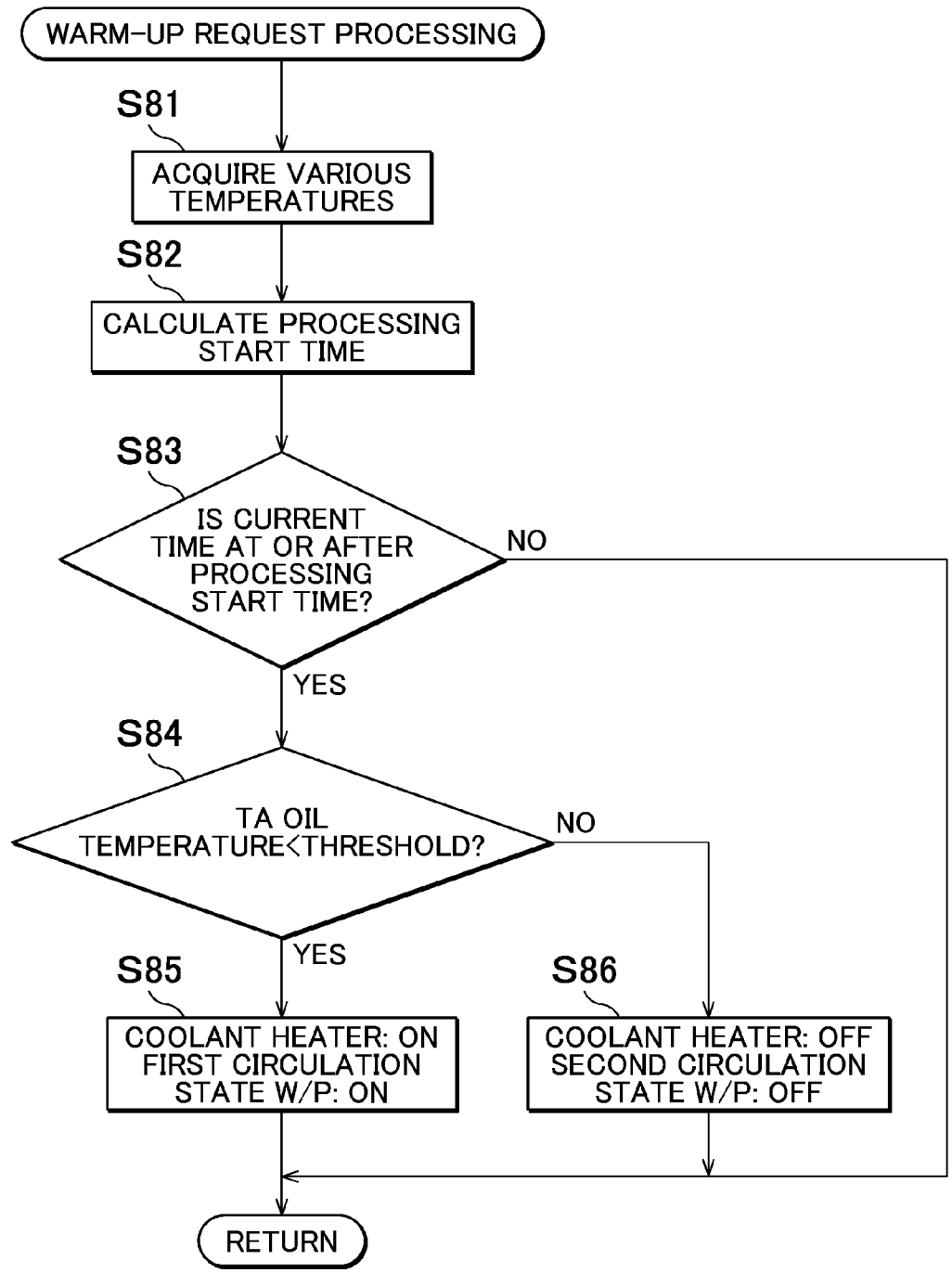
FIG. 8 is a flowchart illustrating an example of a subroutine indicating warm-up request processing defined in FIG. 5.

The heating request processing illustrated in FIG. 7 corresponds to the steps relating to heating of the vehicle cabin 20, which are extracted from the steps in the multiple request processing in FIG. 6. The multiple request processing in FIG. 6 includes step S56 and step S58. In step S56, the electronic control unit 45 determines whether the temperature of the coolant exceeds the threshold to determine whether the vehicle cabin 20 can be heated with the exhaust heat from the coolant heated during the warm-up of the transaxle 3. In step S58, the electronic control unit 45 turns off the coolant heater 22 when the temperature of the coolant exceeds the threshold. On the other hand, the heating request processing in FIG. 7 does not include any steps corresponding to step S56 and step S58 in FIG. 6, because using the exhaust heat from the coolant is not taken into account in the heating request processing in FIG. 7. Similarly, the warm-up request processing illustrated in FIG. 8 corresponds to the steps relating to a warm-up of the transaxle 3, which are extracted from the steps in the multiple request processing in FIG. 6. The details of the steps in FIG. 7 and FIG. 8, which are the same as the details of the corresponding steps in the multiple request processing in FIG. 6, will be omitted from the following description.

With the heat management system 19 according to the present embodiment, a warm-up of the transaxle 3, which requires a coolant temperature higher than the coolant temperature required for heating of the vehicle cabin 20, is carried out first, and then heating of the vehicle cabin 20 is carried out before the operation of the vehicle. Thus, the exhaust heat available after the completion of warm-up of the transaxle 3 can be used to heat the vehicle cabin 20. This makes it possible to reduce wasted heat generation.

In the comparative example illustrated in FIG. 4A and FIG. 4B, the vehicle cabin 20 is heated first, and then the transaxle 3 is warmed up. In this case, the temperature of the coolant after the completion of warm-up exceeds 70° C. In contrast to this, according to the present embodiment illustrated in FIG. 3A and FIG. 3B, the transaxle 3 is warmed up first, and then the vehicle cabin 20 is heated. In this case, the temperature of the coolant after the completion of heating of the vehicle cabin 20 is lower than 40° C. If the coolant temperature difference at the completion of these two kinds of preheating (preheating in the comparative example and preheating in the present embodiment) is Δt, Δt=30° C. (=70−40) is satisfied. Therefore, the heat management system 19 according to the present embodiment makes it possible to reduce the amount of heat corresponding to Δt·Cw from the amount of heat in the comparative example, if the prescribed temperatures illustrated in, for example, FIG. 3A are assumed and the heat capacity of the coolant is denoted by Cw.

The electronic control unit 45 according to the present embodiment may function as a preheating control unit in the invention, by executing the control routines in FIG. 5 and FIG. 6. However, the invention should not be limited to the foregoing embodiment, and may be implemented in various other embodiments. Although the vehicle according to the foregoing embodiment is a hybrid vehicle, the invention may be applied to any kinds of vehicles provided with a speed change apparatus lubricated with lubricant oil and an air-conditioner. For example, the invention may be applied to electric vehicles.

The foregoing embodiment of the invention is applied to the vehicle provided with the transaxle 3, which is an example of a speed change apparatus described herein. However, embodiments of the invention may be applied to vehicles provided with a speed change apparatus, such as a continuously variable transmission, as long as preheating before the operation of the vehicle can be carried out.

In the foregoing embodiment, coolant is used as the heat medium. However, many kinds of substances may be used as the heat medium in the disclosure, as long as heat exchange between the substance and the lubricant oil can be carried out by a heat exchanger.

What is claimed is:

1. A vehicular heat management system comprising:
a speed change apparatus lubricated with lubricant oil;
an air-conditioner including a heater core, the air-conditioner configured to heat a vehicle cabin of a vehicle by using the heater core as a heat source;
a heater configured to carry out heating of a heat medium and to stop said heating;
a heat exchanger configured to carry out heat exchange between the lubricant oil and the heat medium;
a heat medium circulator configured to switch a circulation state of the heat medium between a first circulation state where the heat medium is circulated through the heater and the heat exchanger, and a second circulation state where the heat medium is circulated through the heater and the heater core; and
an electronic control unit configured to:
i) warm up the speed change apparatus by heating the lubricant oil in response to a pre-operation warm-up request, before an operation of the vehicle;
ii) heat the vehicle cabin in response to a pre-operation heating request, before the operation of the vehicle; and
iii) execute a first operation and a second operation after there are both the pre-operation warm-up request and the pre-operation heating request are issued
the first operation being an operation in which the lubricant oil is heated to a prescribed oil temperature by the heat exchanger in the first circulation state while the heat medium is heated by the heater, and
the second operation being an operation in which the circulation state is switched from the first circulation state to the second circulation state after the lubricant oil reaches the prescribed oil temperature, and heating of the heat medium by the heater is stopped until a vehicle cabin temperature of the vehicle cabin reaches a prescribed cabin temperature.

2. The vehicular heat management system according to claim 1, wherein:
the heat medium circulator includes a pump configured to pump the heat medium to be circulated, a main path through which the heat medium flows, a first branch path, a second branch path, a first valve, and a second valve;
the pump and the heater located downstream of the pump are disposed on the main path;
the main path branches into the first branch path and the second branch path, at a branching point located between the heater and the pump;
the first branch path and the second branch path merge into the main path, at a merging point located upstream of the pump;
the heat exchanger is disposed on the first branch path;
the heater core is disposed on the second branch path;
the first valve is configured to be operated between an opening position for opening the first branch path and a closing position for closing the first branch path;
the second valve is configured to be operated between an opening position for opening the second branch path and a closing position for closing the second branch path; and
the electronic control unit is configured to control, after both the pre-operation warm-up request and the pre-operation heating request have been issued, the first valve and the second valve to
i) place the first valve in the opening position and place the second valve in the closing position while the heat medium is heated by the heater, as the first operation, and
ii) place the first valve in the closing position and place the second valve in the opening position while heating of the heat medium by the heater is stopped, as the second operation that is executed after completion of the first operation.

* * * * *